United States Patent [19]
Miller et al.

[11] Patent Number: 5,859,811
[45] Date of Patent: Jan. 12, 1999

[54] METHOD OF ANALYZING WAVEFORMS

[75] Inventors: Douglas Miller, Sandy Hook, Conn.; Fred E. Stanke, Palo Alto, Calif.

[73] Assignee: Schlumberger Technology Corporation, Ridgefield, Conn.

[21] Appl. No.: 609,114

[22] Filed: Feb. 29, 1996

[51] Int. Cl.$^6$ ...................................................... G01V 1/40
[52] U.S. Cl. ................................. 367/35; 367/25; 367/38
[58] Field of Search .................................. 367/35, 44, 38, 367/25; 181/105

[56] References Cited

U.S. PATENT DOCUMENTS

| | | | |
|---|---|---|---|
| 4,255,798 | 3/1981 | Havira | 367/35 |
| 4,885,722 | 12/1989 | Leland | 367/25 |
| 4,928,269 | 5/1990 | Kimball et al. | 367/35 |
| 5,124,952 | 6/1992 | Knize et al. | 367/34 |
| 5,274,604 | 12/1993 | D'Angelo et al. | 367/35 |
| 5,491,668 | 2/1996 | Priest | 367/35 |

FOREIGN PATENT DOCUMENTS

0549419 A2  6/1993  European Pat. Off. .

OTHER PUBLICATIONS

A.J. Hayman, et al., "High–Resolution Cementation and Corrosion Imaging by Ultrasound," *SPWLA 32nd Annual Logging Symposium* (Jun. 16–19, 1991).

J. Haldorsen, et al., "Multichannel Wiener Deconvolution of Vertical Seismic Profiles," *Geophysics,* V59 (Oct. 1994), pp. 1500–1511.

J. Haldorsen, et al., "Walk–away VSP Using Drill Noise as a Source," *Geophysics,* V60, (Jul.–Aug. 1995), pp. 978–997.

*Primary Examiner*—Ian J. Lobo
*Attorney, Agent, or Firm*—Leonard W. Pojunas; Brigitte L. Jeffery; Keith G. W. Smith

[57] ABSTRACT

A method of analyzing a spatial series of waveforms, each waveform of which contains components arising from at least two substantially uncorrelated features, includes the steps of sorting the waveforms into groups or bins according to values of one or more of the features, determining a mean waveform for each group or bin, subtracting the mean waveform from each waveform in the group or bin, returning the waveforms to the original order of the series and determining a remaining feature. Binning, the process of sorting waveforms into groups based on values of features, can be performed for one feature determined from the waveform or for several features. All that is required is that the binning criteria are substantially uncorrelated with the feature of interest. An example of a binning criterion can be frequency or period of a component of the waveform. Also a value of a physical parameter calculated from the waveform can be used as a binning criterion.

29 Claims, 7 Drawing Sheets

(4 of 7 Drawing Sheet(s) Filed in Color)

FIG.4a
FIG.4b
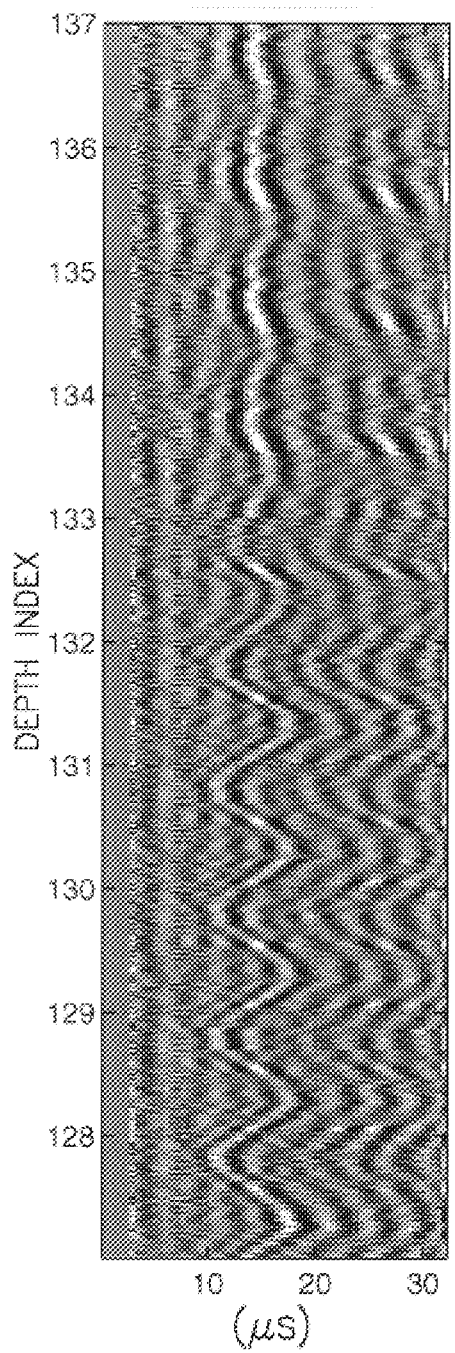
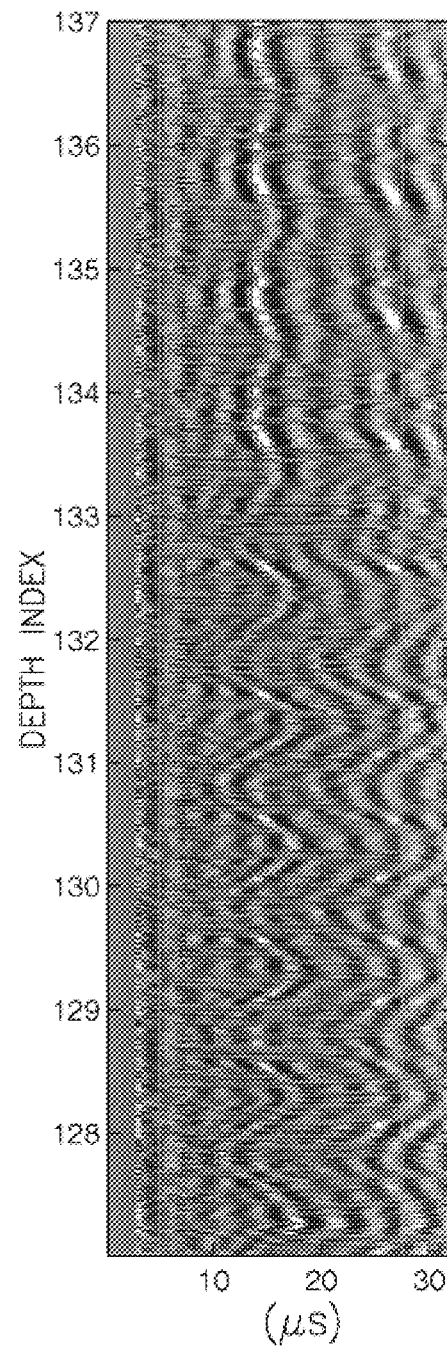

METHOD OF ANALYZING WAVEFORMS

FIELD OF THE INVENTION

The present invention provides methods for analyzing waveforms which have interacted with their environment for the purpose of investigation or evaluation. In particular, the invention relates to the analysis of waveforms obtained in well logging operations such as ultrasonic waveforms obtained in cased wells so as to be able to identify components of waveforms due to echoes from so-called "third interfaces" and to account for such components when analyzing the waveforms to evaluate parameters of the casing and cement.

BACKGROUND OF THE INVENTION

There are various measurement or investigation techniques which involve detecting and analyzing waveforms which have interacted with their environment. Examples of such techniques are radar techniques and acoustic techniques, both of which can be used for investigations of underground formations from within a borehole. In such techniques, one or more waveform signals are transmitted from transmitting locations so as to interact with the environment due to reflection, refraction etc., and are measured at one or more receiving locations which may be the same as the transmitting locations or separate. The measured waveforms have been changed from the transmitted form by interaction with the environment and analysis of the waveform allows properties of the environment to be obtained, for example, the presence of reflecting bodies or the nature of the medium through which the waves have passed. Since it is the spatial distribution of the measured properties which is generally of interest, the analysis must relate the information gained to some spatial reference, typically the transmitting and receiving locations. However, if there is any form of interference which is correlated with position, this can be difficult to identify in analysis. One example of such a technique which suffers from this problem is ultrasonic evaluation of cement in a cased well.

In a well completion, a string of steel casing is set in a wellbore and cement is forced into the annulus between the casing and the earth formation. The primary purpose of the cement is to provide zonal isolation of oil and gas producing layers and water bearing strata. If the cement fails to provide isolation of one zone from another, formation fluids under pressure may migrate from one zone to another, reducing production efficiency. Cement failures can occur in a variety of ways. For example, a complete absence of cement between the casing and the earth formation can occur. This is characterized as a gross cement failure and leads to rapid communication between zones intended to be isolated. Another type of failure arises when channeling occurs within the cement annulus, somewhere between the casing and the formation. There are three commonly occurring types of channels: a channel which contacts the casing is referred to as a "near channel", a channel which does not contact the casing is referred to as a "far channel" or a "buried-channel" (for a buried channel, the region between the channel and the casing is usually cement), and a channel occupying the entire space between the casing and the formation is referred to as either a "full channel" or a "traditional channel". All the channels described above may be filled with fluids such as mud or gas and all are potential threats to hydraulic isolation. Another condition which occurs, but which is not generally viewed as a cement failure, is known as micro-annulus. This condition occurs when the cement that has filled the annulus is not properly bonded to the casing resulting in a very narrow fluid-filled annulus immediately outside the casing. This annulus is very small and does not affect fluid communication between layers, effectively preserving the hydraulic security function of the cement.

A number of interfaces exist at the junctures of the differing materials within the completed wellbore. A first interface exists at the juncture of the fluid in the casing and the casing itself. A second interface is formed between the casing and a second material adjacent to the exterior of the casing, usually cement in a well-cemented situation. A third interface exists between the cement and a third material which is usually the earth formation. Imperfect cementing operations can result in a variety of interface conditions. A channel contacting the casing results in the second interface being between the casing (first material) and a fluid (second material). In this case, the third interface is formed between a fluid (second material) and the earth formation (third material) where a full channel exists. Alternatively, the third interface is formed between a fluid (second material) and the cement (third material) where a near channel exists. A channel not contacting the casing, results in the second interface being between the casing (first material) and the cement (second material) and the third interface being between the cement (second material) and a fluid (third material). Existence of an interface at the juncture of cement and fluid causes a potential lack of hydraulic isolation.

The problem of investigating the cement outside a casing with a tool located inside the casing has lead to a variety of cement evaluation techniques using acoustic energy including ultrasonic cement evaluation. U.S. Pat. No. 4,255,798 (incorporated herein by reference) describes methods and apparatus for acoustically investigating a casing in a borehole and the cement present outside the casing. Casing thickness is also determined. The techniques employ an acoustic pulse source having a frequency spectrum selected to excite a thickness resonance in the insonified portion of the casing. The thickness resonance exists as acoustic reverberations between the inner and outer walls of the casing, i.e. trapped energy. The duration of the reverberations depends on the rate of acoustic energy leaking into adjacent media. The acoustic return from the casing can be thought of in two distinct portions. The first portion appears as a large amplitude pulse (first interface echo) which represents the energy reflected from the first, fluid-steel interface, i.e., the inside surface of the casing. The second portion appears as a decaying resonance which represents the reverberating energy trapped within the casing that has leaked back into the fluid within the casing. The received acoustic pulse is then processed to determine casing thickness or to evaluate the quality of the cement bond to the casing which is typically evaluated by determining the acoustic impedance of the cement. In one example of processing, thresholds are applied to the acoustic impedance to determine if the material outside the casing at a given point is solid (cement), liquid or gas.

The presence of echoes from third interfaces present in ultrasonic waveforms gives rise to two issues in cement evaluation. The third interface echoes can interfere with the analysis of the waveforms to determine cement impedance and so give a misleading impression of the quality of the cement present and false indications of the material, e.g. indicate liquid or gas when solid is present. One method of filtering the signals to deal with these echoes is described in U.S. Pat. No. 5,274,604. The third interface echoes can also be used to identify channels in the cement which might compromise zonal isolation as is described in European Patent Application No. 0,549,419 A2.

The problem of identifying and accounting for third interface echoes in ultrasonic cement evaluation is one example of an acoustic measurement technique in which two features are present, each of which interferes with the detection of the other. In this particular example, the effects arising from the first feature, the casing, i.e. first and second interface echoes, interfere with the detection of the third interface echo. Likewise, the third interface echo interferes with the determination of cement impedance from the casing resonance. The spatial filter described in U.S. Pat. No. 5,274,604 represents one approach in dealing with this problem.

It is an object of the present invention to provide a method which can be used to analyze acoustic waveforms, particularly ultrasonic waveforms from cased wells to deal with such interferences as typified by casing echoes and third interface echoes.

SUMMARY OF THE INVENTION

The broadest aspect of the invention comprises a method of analyzing waveforms which contain components arising from at least first and second substantially uncorrelated features, the method comprising: defining a parameter space based on at least one parameter which is associated with the waveforms; determining a parameterized form of a filter for removing waveform components arising from the first feature while leaving waveform components arising from the second feature; and applying a specific filter to each waveform according to the position of the waveform in the parameter space.

By analyzing the waveforms in a parameter space based on parameters derived from the waveforms themselves, the invention allows features which are correlated with spatial position of the waveform to be identified and, if required, removed.

In one preferred embodiment, the parameter space has a single parameter, which is the period of the casing resonance, and the filter collects all the waveforms having the same parametric value to a given tolerance into bins, then subtracts the mean trace at each bin from all the traces in each bin and returns the waveforms to the original order of the series. This filter tends to remove trace components related and to the casing, and to retain components related to reflection from a third interface.

Binning, the process of sorting waveforms into groups based on values of parameters, can be performed for one parameter determined from the waveform or for several parameters. All that is required is that the binning criteria are substantially uncorrelated with the feature of interest. An example of a binning criterion can be frequency or period of a component of the waveform. Also a value of a physical parameter calculated from the waveform can be used as a binning criterion.

Bin processing, comprising binning, determining mean waveforms and subtracting a scaled mean from the members of a bin, can be performed as often as necessary using different binning criteria. It is to be noted that the effect of binning on the basis of two criteria together is not the same as bin processing on one criterion then bin processing on the other.

A first specific embodiment of the invention provides a method of analyzing acoustic waveforms, such as ultrasonic waveforms obtained in a cased well, comprising the steps of a) obtaining a series of waveforms from sequential geometric positions in the well, for example by rotating a transducer as it is logged up the well; b) identifying and removing echoes resulting from a first interface in each waveform; c) determining a part of each remaining waveform due to casing resonance and analyzing each waveform to determine a parameter which is typically related to the casing thickness; d) sorting waveforms into bins, each bin including waveforms for which values of the parameter are substantially the same; e) determining a mean waveform for each bin and subtracting the mean waveform (scaled if required) from each waveform in the bin; and f) ordering the waveforms in accordance with the sequential geometric positions from which they were originally obtained and identifying echoes resulting from a third interface.

The waveforms are preferably normalized and shifted to align peaks prior to removal of echoes resulting from a first interface, and filtered to reduce casing resonance amplitude in each waveform.

In one embodiment, parameter bins are chosen such that the parameter is resonant period and the waveforms in a bin all have resonant periods which differ by less than about 0.001 $\mu$s. In any event, the parameter should be substantially uncorrelated with the position of a waveform in the series or the presence of third interface echoes. Calculated parameters, such as cement impedance and tool standoff, can also be used as binning parameters.

A second specific embodiment of the invention provides a method of analyzing a series of waveforms which have been normalized and shifted to align echoes resulting from a first interface; determining a parameter related to casing thickness for each waveform and sorting waveforms into first bins, each first bin including waveforms for which values of the parameter are substantially the same; determining a mean waveform for each first bin and subtracting the mean waveform (scaled, if desired) from each waveform in the first bins so as to remove echoes resulting from first and second interfaces and leave echoes resulting from a third interface; shifting the waveforms to align third interface echoes; sorting the shifted waveforms according to values of the parameter related to thickness and dividing the sorted waveforms into second bins; determining a mean waveform for each second bin and subtracting this mean waveform (scaled, if desired) from the corresponding (normalized and shifted) waveform in the series to provide a corrected series; and analyzing the corrected series to determine a parameter related to the cement, such as cement acoustic impedance, around the casing.

It is preferred that an image map of cement acoustic impedance is produced in which the interfering effects of third interface echoes are reduced. Both aspects of the invention might be performed on the same series of waveforms to provide not only the improved impedance image, but also an identification of the third interface in appropriate conditions.

BRIEF DESCRIPTION OF THE DRAWINGS

The file of this patent contains at least one drawing executed in color.

FIGS. 4a and 4b show the corresponding waveforms to FIG. 2b after bin processing and a trace showing the locus of tracewise maxima;

DESCRIPTION OF THE PREFERRED EMBODIMENT

Figure 1A:
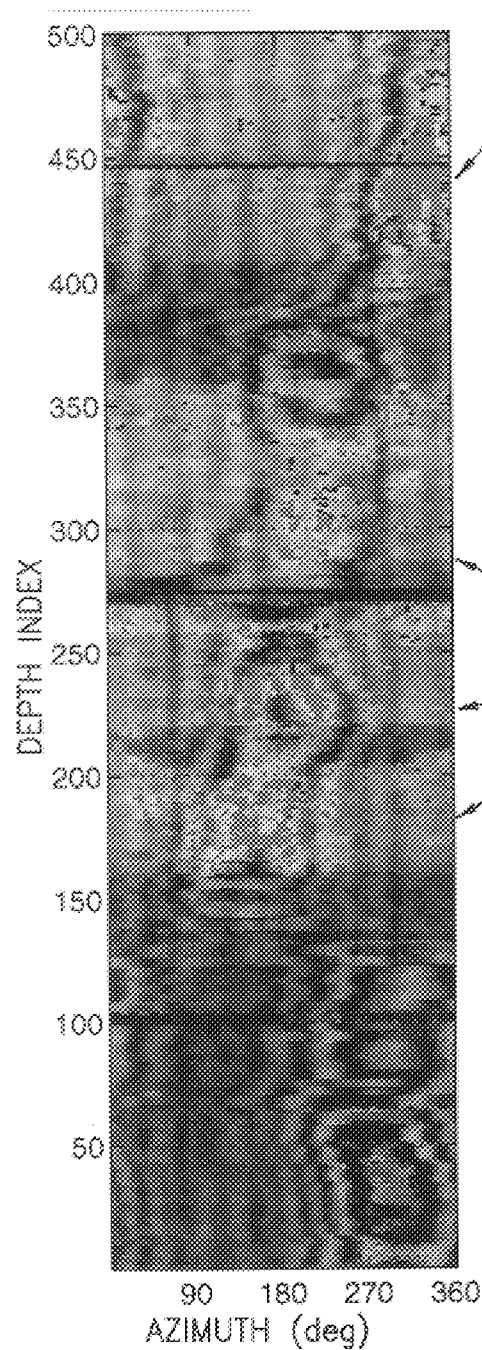
FIGS. 1a and 1b show processed ultrasonic cement evaluation measurements with and without the use of the invention.

In its broad aspect, the invention views data (waveforms) as a signal of interest plus noise. The object is to estimate the noise so that this can be subtracted from data to get the signal of interest. Noise is viewed as a continuous function of one or more key parameters that are a) measurable and b) uncorrelated with the signal of interest.

The method according to the invention resorts the data from its original coordinates (for example in a well logging operation these might be: time, azimuth, depth, where neighboring data may have similar values of signal of interest) to coordinates based on the key parameters. In this new sorting waveforms with similar noise characteristics are neighbors and (by (b)) neighboring traces have dissimilar signal of interest. A "spatial" filter is then applied in this new space, and the data unsorted and placed in its original order. In its simplest form, this approach sorts the data into bins based on measured key parameters and subtracts the mean trace from each bin.

If the function f relates data to key parameters; and g relates key parameters to noise, then data=signal +g (f (data)). Using d and d' as variables standing for waveforms taken from a set of waveforms D, the estimated signal (sigest) from data d is given by:

$$sigest(d)=d-mean(\{d': f(d')=f(d)\})=d-g(f(d))=d-f_1(d)$$

An estimated signal from a particular waveform is the difference between that waveform and the mean over all waveforms in D which have the same key parameters as the original.

It is possible to use multiple key parameters either in serial or parallel. For example, taking key parameters $k_a$, $k_b$ ... with maps $k_a=f_a(d)$ $k_b=f_b(d)$, ... etc., in parallel mode, bins are made in which all parameters are matched:

$$sigest(d)=d-mean(\{d' f_a(d')=f_a(d) \& f_b(d')=f_b(d) \& \ldots \})$$

An estimated signal for a particular waveform d in this case, is the difference between d and the mean of all waveforms d' which have the same key parameters $k_a$, $k_b$, ... as d itself. As the number of parameters is increased, for a given set of data, the average number of waveforms d' which meet the criteria for inclusion in the mean decreases.

In serial mode, bins are made for each parameter (or group of parameters) and iterated:

$$sigest_a(d)=d-mean(\{d': f_a(d')=f_a(d)\})$$

$$sigest_b(d)=sigest_a(d)-mean(\{sigest_a(d'):f_b(d')=f_b(d)\})$$

The quality of estimation in all the above cases depends on the number of waveforms in each calculated mean, as well as the lack of correlation of noise components in those waveforms. Increasing the number of parallel parameters and decreasing the tolerance on any parameter increases the number of bins, and reduces the correlation between waveforms in each bin b' (which is desirable) and decreases the average number of waveforms in each bin b' (which is undesirable). Thus there is a tradeoff, which limits the quality of results and, in principle, can be optimized.

Furthermore, increasing the number of waveforms in the total set D will improve the results at the cost of greater computational resources. This is true as long as the waveforms d added to D in fact have the same noise $f_2(d)$ as those waveforms d' already in D.

This general approach can be applied to any suitable set of waveforms for analysis. In particular, the procedure appears to be most useful for analyzing waveforms obtained downhole in underground wells. The waveforms can be acoustic (sonic, ultrasonic etc.) or electromagnetic (radar etc.). The invention will now be described further with specific reference to ultrasonic cement evaluation in cased wells. The goal of cement evaluation is to determine whether the annulus between the casing and formation is filled with cement. The primary purpose of the cement is to prevent flow of fluids in the annulus (i.e., to provide hydraulic isolation). In addition it performs the much easier task of holding the casing in place. U.S. Pat. No. 4,255,798 describes methods and a tool for cement evaluation. The result of analyzing data from this tool is often represented as a cement impedance map around the borehole. Certain interferences, known as "galaxy patterns", have been found in impedance maps and arise due to echoes from the formation interface. For the purposes of this description, the first interface is the inner surface of the casing, the second interface is the outer surface of the casing, and the third interface is the borehole wall and the cement/formation interface. The volume between the casing and formation is the annulus. Here there are four materials of interest: the mud which fills the casing, the steel of the casing, the cement which fills the annulus, and the formation material itself. In other contexts, the third interface is whatever interface happens to be next outside the casing. "Resonance" refers to that of the casing, which has a frequency and a period (the inverse of the frequency) which is roughly proportional to the thickness.

A typical product of the '798 patent is a thresholded impedance log. This log is intended to be a map indicating the nature of the material immediately outside the casing, based on its acoustic impedance. It is an image in depth and azimuth, and colors can be used to indicate the three important materials one is likely to find in the annulus, for example red to indicate gas, with impedances ranging from 0 to 0.3 MRayl, blue to indicate liquid, i.e., undisplaced mud or unhydrated cement slurry, with impedances ranging typically from 0.3 to 2.6 MRayl, and a colormap ranging from yellow to brown to indicate hydrated cements with impedances ranging typically from 2.6 to 8.0 MRayl. The basic interpretation is that vertically continuous zones of red or blue indicate potential hydraulic communication due to problems with the cement placement.

Third-interface echoes can distort the thresholded impedance map, as shown in FIG. 1a, with "galaxy patterns". These elongated rings are analogous to Newton's rings in optics, i.e., they result from the interference of waves reflected from two diverging surfaces. Processing of data from the '798 patent attempts to measure the decaying resonance in the casing, and does so by neglecting the existence of third-interface echoes. Third-interface echoes are resonant with the same frequency as the casing resonance. If there is a third-interface echo, it can interfere either constructively or destructively with the casing's resonance, depending on the ultrasonic travel time through the cement. Constructive and destructive interference cause erroneously low or high indications of cement impedance, respectively. When the casing is eccentered within the borehole, the traveltime between them is a smooth function of azimuth which can range over several cycles of the resonant period. This produces the galaxy patterns: elongated, concentric patterns of higher and lower apparent impedance on the log. These are a special problem for interpretation especially in the case where there actually is good cement, but the galaxy pattern produces regions of sufficiently low apparent impedance to erroneously indicate a fluid outside the casing.

The present invention can be applied to remove galaxy patterns, and their erroneous indications of annular fluids. The processing uses the ultrasonic waveforms which are telemetered to the surface by the tool. There is one waveform for each pixel on the cement map, i.e., for each azimuth and depth. The current method for processing waveforms is described in the paper entitled "High-Resolution Cementation and Corrosion Imaging by Ultrasound", A. J. Hayman, R. Hutin and P. V. Wright, SPWLA 32nd Annual Symposium, Jun. 16–19, 1991, (hereinafter called "$T^3$") which produces the raw (neither thresholded nor colour coded for liquid and gas) impedance map, and also a map of the thickness of the casing, based on the measured resonant period. The present invention uses these commercial processing results in addition to the waveforms. The invention first extracts third-interface echoes from the waveforms. Then, it iteratively detects and enhances the arrivals from the third interface ("arrival" denotes the first significant peak in the echo). Finally, the processing removes the third-interface echoes from the original waveforms based on the detected arrivals, and re-applies $T^3$ to obtain an improved impedance map, with significantly fewer false indications of fluid outside the casing.

The preferred processing chain for following the third-interface reflection contains the following steps:

$T^3$ to calculate resonant frequencies.

Re-modulate the telemetered demodulated waveforms.

Align and normalize the amplitudes of the first-interface echoes.

Mute data before the second zero-crossing after the peak.

Resonance deconvolve waveforms to collapse the measured resonances.

Sort the data to form bins of traces whose measured resonant periods differ by 0.001 $\mu$s or less. In each bin, subtract the mean trace from all the traces in the bin.

Figure 2A:
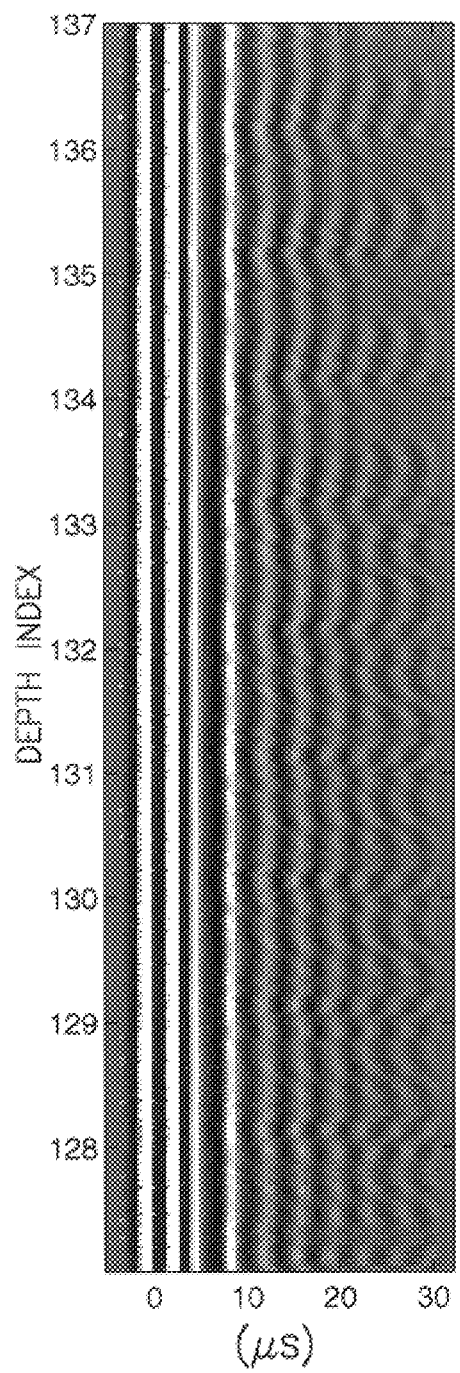
FIGS. 2a and 2b show raw waveforms and waveforms after muting and resonance deconvolution.

FIG. 2a shows raw waveforms from a short segment of data. 720 consecutive waveforms are shown after re-modulation, normalization and shifting to align the peak of the waveforms' envelopes at 0 $\mu$s. There are 72 waveforms per depth of the tool, and each depth covers 4 inches vertically, so FIGS. 2a and b show waveforms from 3 vertical feet. The high-contrast, vertical stripes at early times are the first-interface reflections. Following are the nearly vertical, "wavey" stripes of lower contrast which become progressively wavier with advancing time and represent the resonance in the casing. This resonance is the signal for $T^3$. The waviness is due to variation of the casing's thickness around its circumference.

Figure 2B:
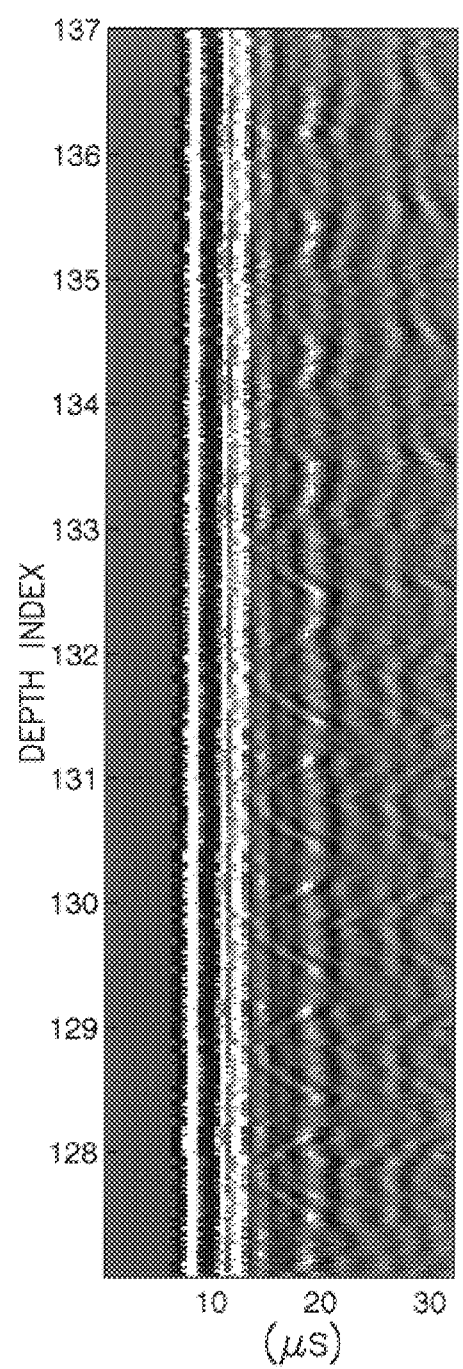

FIG. 2b shows the data from FIG. 2a after it has been muted and resonance deconvolved according to the procedure described in U.S. Pat. No. 5,274,604 (incorporated herein by reference). The impulse response of the resonance deconvolution filter is two delta functions of opposite sign, separated by $T^3$ period (without the frequency correction that is used in standard log presentation). The relative magnitude of the deltas is 0.72, which is correct for deconvolution of a one dimensional resonant waveform where the mud has impedance 1.5 MRayl, the casing 46.25 MRayl, and the cement 6.1 MRayl. The performance of the resonance deconvolution is not very sensitive to this ratio. The resonance deconvolution has reduced the amplitude of the casing resonance which dominates the late times in FIG. 2a to the extent that new, quasi-sinusoidal features are visible. These are the third-interface echoes. The magnitudes of the remnant of the casing resonance and the third-interface echoes are comparable, so that detection of the third-interface echoes is not effective at this stage. The next processing step, "bin processing" removes the casing response by collecting waveforms that have nearly identical properties as measured by the standard processing (e.g. casing thickness, transducer stand-off, cement impedance at the casing). In the simplest implementation, used in the present study, data are gathered into bins with common measured resonant period (rounded here, to the nearest 0.001 $\mu$s). The casing response (first-interface echo and resonance) is removed by subtracting the mean trace from each bin. Since a typical bin will contain data traces from a wide selection of azimuths and depths, the third-interface reflection is likely to occur at random times with respect to the casing reflections and will remain after the mean trace has been removed. This can be thought of as a kind of spatial filter where the original geometric parameter (azimuth) has been replaced by another parameter, e.g. thickness. If n parameters are used, the filter operates in an n-dimensional parameter space. Bin processing requires that the parameters that control the casing response can be measured, and that these parameters are globally uncorrelated with the annular thickness.

In this example, the distribution of resonant periods is approximately Gaussian with a mean value of 3.725 $\mu$s and a standard deviation of 0.103 $\mu$s. The average bin contains about 57 waveforms or traces.

Figure 3A:
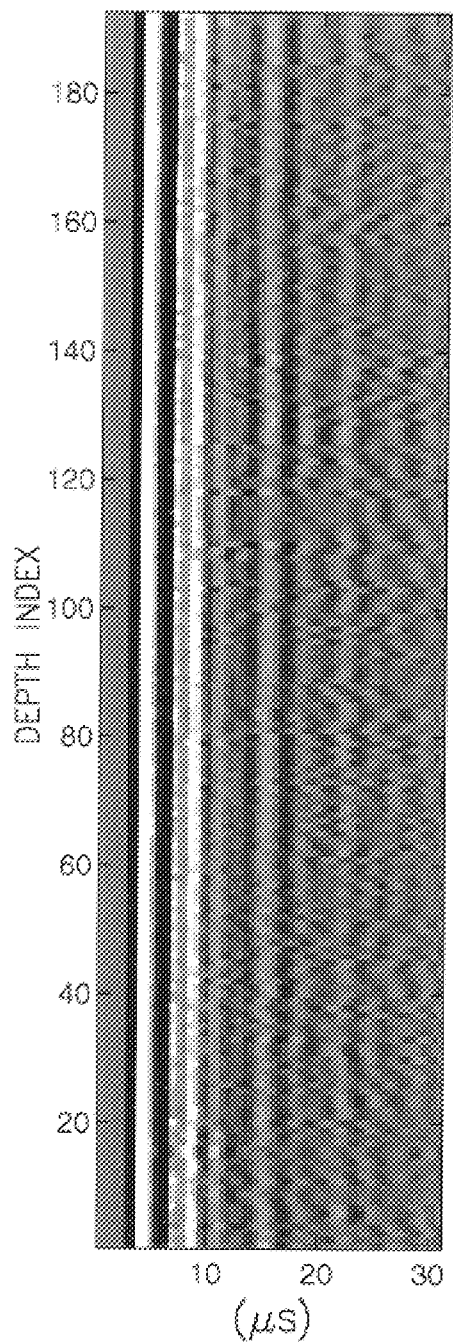
FIGS. 3a and 3b show data waveforms from one resonant period bin before and after removal of the mean trace.
Figure 3B:
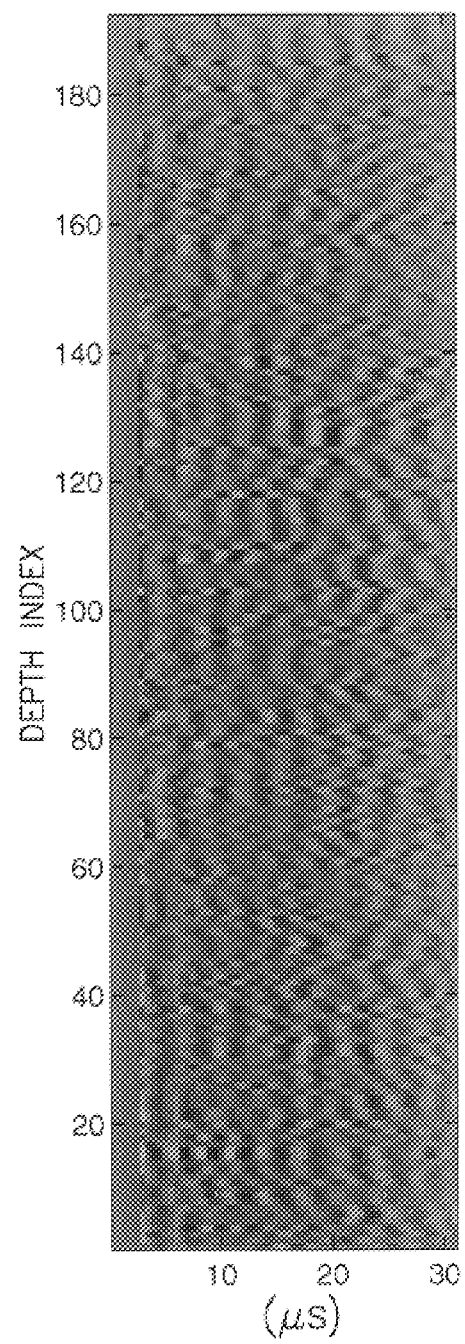

FIG. 3a shows the 193 traces from one particular bin ("400" where the measured resonant period has a value $\tau_0$ in the range 3.7285 $\mu$s<$\tau_0$<3.7295). While some of the waveforms in this bin may have come from those in FIG. 2b, many came from other depths. The very coherent vertical features are those that depend only on thickness (given that the first-interface echoes have been aligned, as described above). No third-interface features are apparent in FIG. 3a, as they are, e.g., in FIG. 2b. In FIG. 2b, the third-interface echoes are spatially coherent since the delay of the third-interface arrival is a smooth function of azimuth and depth when the second and third interfaces are roughly eccentered cylinders. Since the waveforms in FIG. 3a come from random locations, the third-interface echoes arrive at random times, and are incoherent and not easily recognized. FIG. 3b shows that the residual waveforms, after subtraction of the mean waveform for the bin, are essentially incoherent. Bin processing subtracts the mean waveform for each bin from all the waveforms in the bin, and then rearranges the residual waveforms back to their original spatial locations. FIG. 4a shows the waveforms from FIG. 2b after bin processing. The third-interface reflection is clearly visible. FIG. 4b shows the locus of maxima computed tracewise within a 22.5 $\mu$s window centered at the expected mean third-interface arrival time.

It is evident from FIG. 4b that the chain described above does not sufficiently remove first and second-interface effects to the extent that the third interface can be robustly detected by simply picking global peaks of the resulting waveforms. Two additional steps improve the picking and further improve the signal-to-noise ratio by deriving a deconvolution operator using the detected signal:

1) Detect the third-interface reflection wherever possible.
2) Shift data to align the detected event. Solve for a filter that best simultaneously deconvolves all the aligned waveforms. Apply it to unshifted data.

3) Loop on the last two steps (ad libitum).

A model-based detection algorithm improves robustness, at the cost of reducing generality: the borehole shape must conform to some extent to the geometric model incorporated in the detection algorithm. The model used here assumes that the borehole and casing are (roughly) parallel cylinders. The forward model calculates ultrasonic arrival times from geometry. The inverse model calculates geometry, which is unknown in the borehole, from arrival times which are measured ultrasonically. An annealing algorithm improves the probability of picking the correct arrival times to use in the inverse model.

Figure 5:
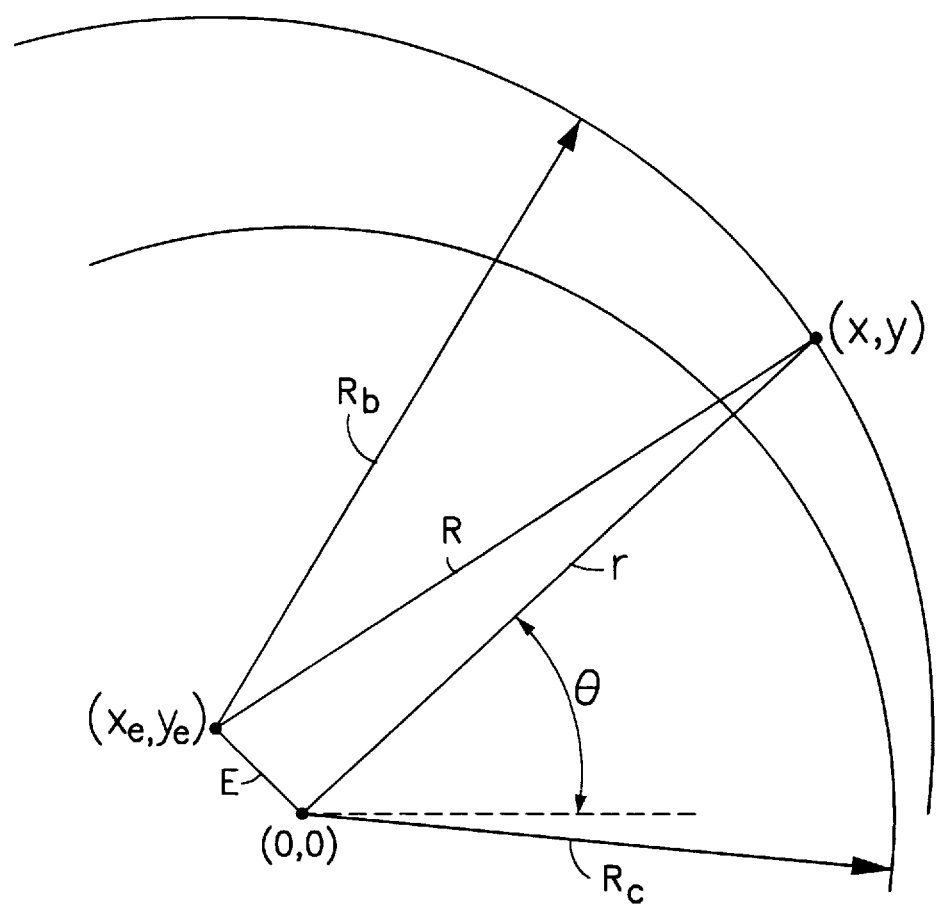
FIG. 5 shows the geometry of an eccentered casing in a borehole.

The following calculation for third-interface-reflection arrival times neglects Snell's law, and assumes straight-ray propagation across boundaries. The known features are a cylindrical borehole of radius $R_b$, a cylindrical casing of outer radius $R_c$, and an eccentering vector $$(x_e, y_e) = E\underline{u}_e \tag{1}$$

between the parallel axes of the cylinders, as shown in cross section in FIG. 5. A vector between the origin (at the center of the casing) and a point on the borehole is given variously as:

$$(x,y) = r(\cos(\theta), \sin(\theta)) = r\underline{u}_r \tag{2}$$

The approximation is that the pulse-echo energy follows rays along $(O,O):(x,y)$ between the transducer and borehole. Then $$(x - x_e)^2 + (y - y_e)^2 = R_b^2 = R^2 \tag{3}$$

$$x^2 + y^2 = r^2 \tag{4}$$

$$r^2 - 2(\underline{u}_e \cdot \underline{u}_r)Er + E^2 - R^2 = 0 \tag{5}$$

$$r = \underline{u}_e \cdot \underline{u}_r + \sqrt{(\underline{u}_e \cdot \underline{u}_r)^2 - E^2 + R^2} \tag{6}$$

Given a cement velocity $v_a$, and the traveltime $t_o$ for the outside of the casing, the third-interface arrival time is $$t = t_0 + \frac{2}{v_a}(r - r_0) \tag{7}$$

Given measured times $\{t_i: i=1, \ldots, N\}$ at azimuths $\{\theta_i = 1, \ldots, N\}$ from one depth, the distances to the borehole are $$r_i = (t_i + t_0)\frac{v_a}{2} + R_c \tag{8}$$

which, with the angles $\theta_i$ give the position vectors $\{(x_i, y_i): i=1, \ldots, N\}$. The linear system in the three scalar unknowns $X_e, Y_e, (R^2 - E^2)$, $$[r_i^2] = [2x_i]x_e + [2y_i]y_e + (R^2 - E^2) \tag{9}$$

is solvable as an overdetermined linear system when $N>3$. Finally R itself is $$R = \sqrt{(R^2 - E^2) + x_e^2 + y_e^2} \tag{10}$$

The invention uses an annealing algorithm that iteratively attempts to fit a model to the third-interface at each depth. Its goal is to automatically detect third-interface arrivals that are apparent to the human eye, in spite of a poor signal-to-noise ratio even after the application of the above processing steps. Throughout the annealing, $v_a$, $t_0$, and $R_c$ are assumed known constants.

Figure 6A:
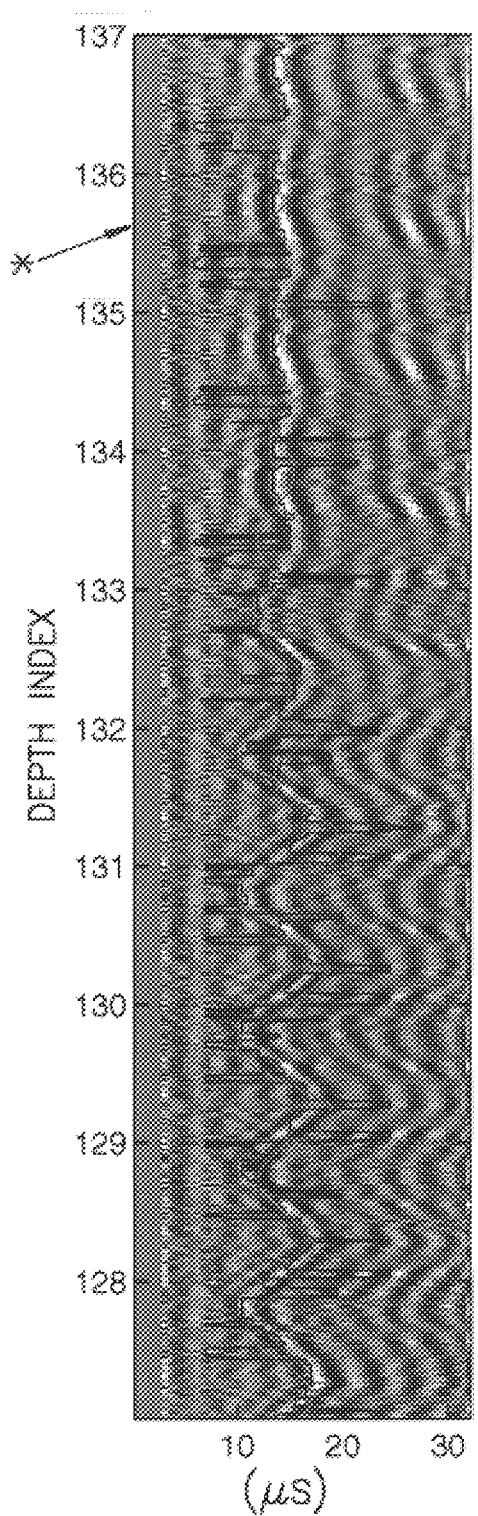
FIGS. 6a, 6b and 6c show the improved detection of third interface echoes on iterations of an annealing algorithm.

The first iteration has several steps. A window of interesting times (i.e. those times at which third interface arrivals are possible and believed detectable) is chosen as beginning at 5 $\mu$s and ending and 27.5 $\mu$s. Within this window, for each waveform, a "pick" is made of a possible third-interface arrival. One possible method for "picking" is peak detection: The maximum value of each waveform within the window is the measured arrival time or "pick", as shown by the line in FIG. 4b. Other detection methods described in the literature, such as the peak of the waveforms' analytic signal, matched filtering, etc. could be used. Some of the picks fall on the visually clear third-interface arrival in the figure, but most do not. At this point some method of removing outliers from the picks is beneficial, e.g. a five-point median filter yields the result shown in FIG. 6a. These filtered picks are closer to the visible third-interface arrival than the unfiltered picks. The inverse model applied to the filtered picks yields an approximation to $(x_e, y_e)$ and R, as shown by the line * in FIG. 6a. This first model is better at some depths than others, but is always visibly "off".

Figure 6B:
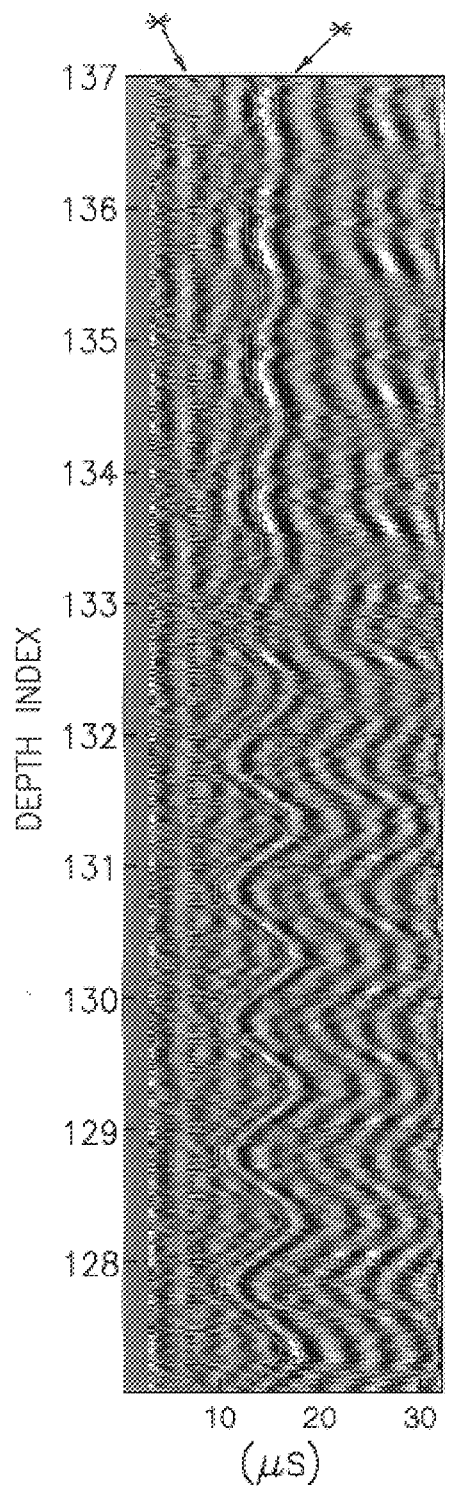
Figure 6C:
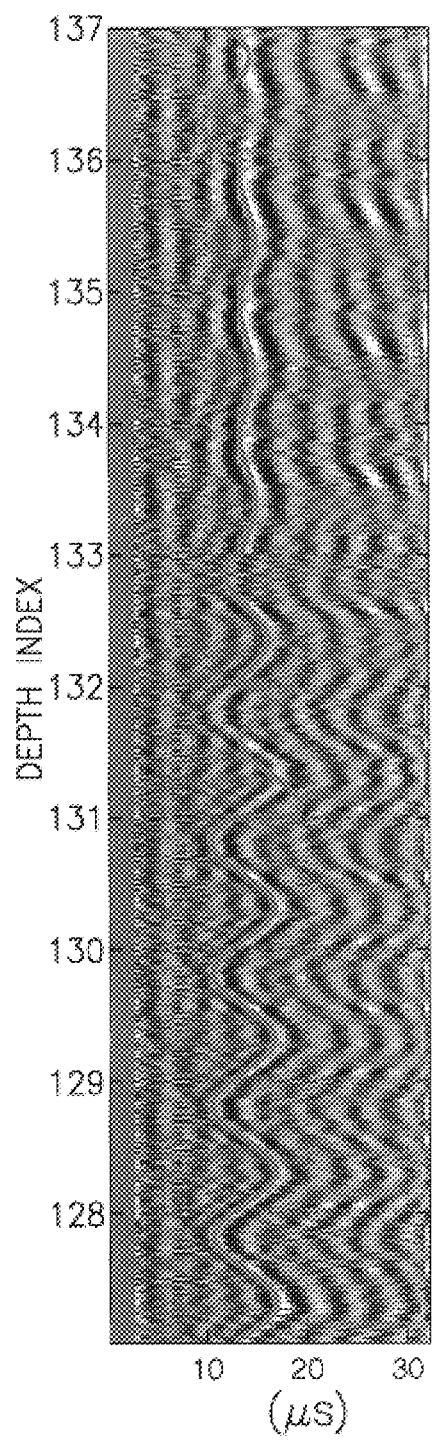

The following iterations in the annealing use progressively narrower windows around the forward model based on the approximations to $(x_e, y_e)$ and R from the previous step. For this example the annealing schedule for the half-width of the window is 12, 10, 8, . . . , 2 ½$\mu$s samples, i.e., reduction of the half width by 2 samples per iteration. The sixth window, based on the fifth model parameters is only 4 samples wide, and clearly contains the peaks of the third-interface reflection for all but the 131st and 136 depths, as shown by the cyan line * in FIG. 6b. The sixth picks $t_{p6}$, shown by line ** in the same figure, are a good representation for the third-interface arrival for the good depths. Finally, the sixth model based on the sixth filtered picks, is a smooth, accurate representation of the visible third-interface arrival for the good depths, as shown in FIG. 6c. It is much better than the first model which appears in FIG. 4b. Thus the iterative annealing has accurately detected 80% of the arrivals in this example without human intervention.

Multichannel Wiener deconvolution (see for example "Multichannel Wiener Deconvolution of Vertical Seismic Profiles," J. Haldorsen, D. Miller and J. Walsh, Geophysics v.59, October 1994, pp. 1500–1511, and "Walk-away VSP Using Drill Noise as a Source," J. Haldorsen, D. Miller and J. Walsh, Geophysics v.60, July–August 1995, pp. 978–997) provides further enhancement of the third-interface echo, to the point that the detection succeeds 100% of the time for this data set. Wiener deconvolution assumes that the events to be enhanced (e.g. the third interface arrivals) have been (at least roughly) aligned in time, and thus depends on some success with the detection algorithm above to provide the picks to align. Given the Fourier spectra of aligned waveforms $S(\omega) = \{s_n(\omega) : n = 1, \ldots, N\}$, the Wiener deconvolution filter F is the solution to the linear system:

$$FS = 1. \tag{11}$$

The least-squares solution is $$F = \frac{\Sigma s_n^*(\omega)}{\Sigma |s_n(\omega)|^2} \tag{12}$$

where sums are over the N spectra, and * denotes complex conjugation. The properties of this form of the Wiener filter are discussed in detail in the above referenced articles.

Any misalignment of the waveforms degrades the performance of the filter, beginning with the higher frequency components of the waveforms. It is advantageous, therefore, to design the filter on waveforms where the detection described above has worked properly. Once the Wiener deconvolution filter has been designed, on some or all the shifted waveforms, it is then applied to all the waveforms with their original time origins. The Wiener filter can additionally be designed and applied to bins of aligned waveforms, e.g. to waveforms having substantially the same resonant period.

Detection and Wiener deconvolution can be iterated for additional improvements in both. Wiener deconvolution enhances the desired third-interface echo, and thereby improves the results of detection. Improved detection leads to better alignment of the waveforms, and thus to an improved Wiener deconvolution filter. A single filter, derived on a set of 10 good depth levels gives a marked improvement in the sample of data used here. The detection algorithm is run a second time and a second pass of deconvolution made, using blocks of 720 traces aligned using the pass-two detections. This gives data in which the filter increases the contrast between the third-interface echo and remaining noise.

One goal is to remove the third-interface echoes from the "raw" data, so that $T^3$ can be re-applied to produce a cement map with reduced galaxy patterns. A summary of the final steps to this goal is:

1) Start with raw waveforms whose first-interface echoes have been aligned and normalized: W1.
2) Thickness-bin process W1 to remove the first- and second-interface echoes, and leave the third-interface echoes: W2.
3) Shift W2 by $t_{pf}$, the final picks in the detection scheme, so that the third-interface arrivals are aligned: W3.
4) Sort W3 by thickness.
5) Calculate averages of thickness-binned W3 as estimates of the third-interface reflections: W4.
6) Appropriately subtract traces in W4 from W1 to remove only the third-interface reflections: W5.
7) Process W5 with $T^3$.

The first two steps of the this procedure overlap with the first three and sixth steps in the processing chain for extracting the third-interface reflection. It is possible and advantageous to commute the steps in the earlier procedure, so that muting and resonance deconvolution follow bin processing, allowing the current procedure to begin with its third step. The resonance deconvolution is inappropriate for this procedure, because it would collapse the resonance measured in the final step.

The bin processing to remove the third-interface echoes is somewhat different than the first bin processing to remove the head and resonance. Before calculating the averages of W3, a tapered mute to remove the remnants of the first-interface echoes after the first bin processing is advantageous. The current chain uses a window that begins at $t_{p6}$ with a Hamming taper with a half width of 15 sample points. The bins for this procedure were 500 consecutive waveforms from the set sorted by thickness. Thus the number of waveforms per bin was predetermined, rather than the range of periods in each bin. The bin processing is robust, and is not affected by such changes in procedure. The averages of bins of W3 should account for the different remaining lengths of the waveforms after shifting, to avoid bias. The waveforms have been normalized by the amplitudes of their first-interface echoes, and binned by their resonant period, so the third-interface echoes, even within the same bin, are likely to have different amplitudes. Projection of the average back onto each waveform in the bin from which it was derived yields an estimate of amplitude of the third-interface echo for each waveform. This amplitude should scale the third-interface echo to be subtracted from each waveform. Again, the projection operation must account for the different lengths of the waveforms to remain unbiased. Finally, unlike the original bin processing, the bin averages are not subtracted from the waveforms from which they derive, but rather from the raw waveforms W1, which still have their resonances intact. Thus it was necessary not to apply any deconvolution during this estimation of the third-interface echoes.

Figure 1B:
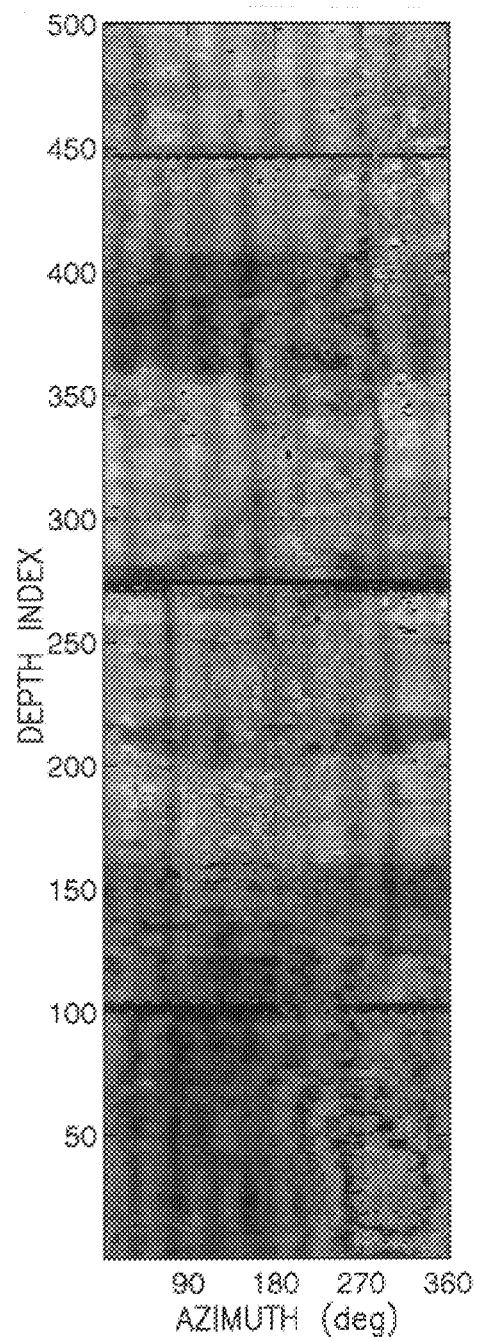

This algorithm effectively removes the third-interface echoes from the waveforms, as shown by the removal of galaxy patterns in FIG. 1b. Dectection of the third-interface echo allows the removal of galaxy patterns which distort impedance maps and the existence of galaxy patterns is an indication that the third-interface echoes are strong, i.e. detectable. The invention could also be used to provide further diagnosis and interpretation of the cement job, as well as information about the formation outside the casing.

The interpretation of ultrasonic waveforms processed according to the invention for the determination of cement properties such as velocity when the borehole diameter is known (e.g., in-gauge) is also possible by fixing the value of R and iteratively solving for $x_e, y_e$, and $v_a$. Suppose $v_0$ and $R_0$ are the true values for the annular velocity and third-interface radius respectively. For any value v approximating $v_a$, let R(v) be the value obtained from (9) and (10) using $v_a = v$. Then we have the approximate equality based on the known traveltime, $$v_0(R(v)-R_c) \approx v(R_0-R_c) \qquad (13)$$

This suggests an iteration scheme to find a sequence converging to $v_0$:

$$v_{n+1} = v_n \frac{R_0 - R_c}{R(v_n) - R_c} . \qquad (14)$$

We claim:

1. A method of analyzing waveforms which contain components arising from at least first and second substantially uncorrelated features, the method comprising:
   a) determining a value of at least one parameter from each waveform;
   b) determining a mean waveform for waveforms having similar values of the at least one parameter;
   c) scaling said mean waveforms to derive scaled mean waveforms;
   d) subtracting the scaled mean waveform from each waveform having the similar value of the at least one parameter; and
   e) analyzing the waveforms to determine the second feature.

2. A method as claimed in claim 1, comprising:
   a) sorting the waveforms into bins according to values of the at least one parameter;
   b) determining a mean waveform for each bin;
   c) subtracting the mean waveform for each bin from each waveform in the corresponding bin; and
   d) analyzing the waveforms to determine the second feature.

3. A method as claimed in claim 2, further comprising sorting the waveforms into bins on the basis of values of a plurality of parameters.

4. A method as claimed in claim 3, wherein the plurality of parameters includes at least one parameter not determined from the waveforms.

5. A method as claimed in claim 1, wherein the waveforms are obtained from measurements made in an underground borehole.

6. A method as claimed in claim 5, wherein the waveforms are selected from the group consisting of acoustic waveforms and electromagnetic waveforms.

7. A method as claimed in claim 5, for analyzing acoustic waveforms obtained in a cased well, comprising:
   a) obtaining a series of waveforms from sequential geometric positions in the well;
   b) normalizing and shifting the waveforms to align echoes resulting from a first interface;
   c) determining values of at least one parameter related to the first interface for each waveform and sorting waveforms into groups, each group including waveforms for which values of the parameter are substantially the same;
   d) determining a mean waveform for each group and subtracting the mean waveform form each waveform in the group; and
   f) ordering the waveforms in accordance with the sequential geometric positions from which they were originally obtained and identifying echoes resulting from a third interface.

8. A method as claimed in claim 7, further comprising after step d):
   i) shifting the waveforms to align third interface echoes;
   ii) sorting the shifted waveforms according to values of the parameter related to thickness and dividing the sorted waveforms into further groups;
   iii) determining a mean waveform for each further group and subtracting this mean waveform from the corresponding waveform in the series to provide a corrected series; and
   iv) analyzing the waveforms in the corrected series to determine a parameter related to cement around the casing.

9. A method as claimed in claim 7, wherein the at least one parameter comprises a parameter relating to casing thickness.

10. A method as claimed in claim 7, wherein the series of waveforms are obtained using a tool which is positioned in the well, the at least on parameter comprising an acoustic signal transit time and a tool eccentering angle.

11. A method of analyzing acoustic waveforms obtained in a cased well, comprising:
   a) obtaining a series of waveforms from sequential geometric positions in the well;
   b) identifying and removing echoes from a first interface in each waveform;
   c) determining a part of each remaining waveform due to casing resonance and analyzing each waveform to determine a parameter;
   d) sorting waveforms into bins, each bin including waveforms for which values of the parameter are substantially the same;
   e) determining a mean waveform for each bin;
   f) scaling said mean waveforms to determine scaled mean waveforms for each bin;
   g) for each bin, subtracting the scaled mean waveform from each waveform in the bin; and
   h) ordering the waveforms in accordance with the sequential geometric positions from which they were originally obtained and identifying echoes resulting from a third interface.

12. A method as claimed in claim 11, further comprising normalizing and shifting the waveforms to align peaks prior to removal of echoes resulting from a first interface.

13. A method as claimed in claim 11, further comprising filtering to reduce casing resonance amplitude in each waveform.

14. A method as claimed in claim 11, wherein the parameter is selected from the group consisting of casing thickness, transducer standoff, cement impedance at casing, resonant frequency and resonant period.

15. A method as claimed in claim 11, further comprising:
   i) determining a position of an echo in a waveform in the series as determined resulting from the third interface;
   ii) determining a filter required to shift the third interface echo in that waveform identified in step f) to the position of that determined in step i); and
   iii) applying the filter to remaining echoes identified in step f) to provide revised positions for third interface echoes.

16. A method as claimed in claim 11, further comprising analyzing at least part of the series of waveforms to determine the casing position in the well.

17. A method as claimed in claim 16, wherein the position of the casing in the well is determined from arrival times of echoes resulting from the third interface.

18. A method as claimed in claim 17, wherein the position is determined by:
   i) defining a time window in which the third interface echoes are expected to lie;
   ii) applying the window to the waveforms and selecting a maximum falling within the window for each waveform to define a series of unfiltered echoes;
   iii) applying a filter to the series to remove outliers and define a filtered series;
   iv) fitting a model to the filtered series; and
   v) determining values for radius of the third interface and eccentering vector of the casing in the well from the model.

19. A method as claimed in claim 18, further comprising iterating steps i)–v), using a progressively narrower window for each iteration and wherein the model used in each iteration is based on the model used in the preceding iteration.

20. A method as claimed in claim 19, further comprising enhancing the third interface echoes by means of multichannel Wiener deconvolution.

21. A method as claimed in claim 11, further comprising using the waveforms and the third interface echoes to produce an image of parameters related to the casing around the well.

22. A method as claimed in claim 21, wherein the image shows variation of parameters in a radial direction away from the casing.

23. A method as claimed in claim 22, wherein the image is used to identify buried channels in cement around the casing.

24. A method of analyzing acoustic waveforms obtained in a well having a casing located therein and surrounded by cement, comprising:
   a) obtaining a series of waveforms from sequential geometric positions in the well;
   b) normalizing and shifting the waveforms to align echoes resulting from a first interface;
   c) determining a parameter related to casing thickness for each waveform and sorting waveforms into first bins, each first bin including waveforms for which values of the parameter are substantially the same;
   d) determining a mean waveform for each first bin and subtracting a scaled version of the mean waveform from each waveform in the corresponding first bins so as to remove echoes resulting from first and second interfaces and leave echoes resulting from a third interface;

e) shifting the waveforms to align third interface echoes;

f) sorting the shifted waveforms according to values of the parameter related to thickness and dividing the sorted waveforms into second bins;

g) determining a mean waveform for each second bin and subtracting a shifted and scaled version of this mean waveform from the corresponding waveform in the series so as to rename the third interface echo and provide a corrected series; and h) analyzing the corrected series to determine a parameter related to the cement around the casing.

25. A method as claimed in claim 24, further comprising prior to step g), applying a window to the waveforms to remove any remnants of echoes resulting from the first interface.

26. A method as claimed in claim 24, wherein the parameter related to the cement around the casing is acoustic impedance which is displayed as an image around the borehole indicative of gas, liquid and solids.

27. A method of analyzing waveforms which contain components arising from at least first and second substantially uncorrelated features, the method comprising:

(a) determining a value of at least one parameter from each waveform;

(b) determining a mean waveform for waveforms having similar values of the at least one parameter;

(c) subtracting the mean waveform from each waveform having the similar value of the at least one parameter; and (d) analyzing the waveforms to determine the second feature.

28. A method of analyzing acoustic waveforms obtained in a cased well, comprising:

(a) obtaining a series of waveforms from sequential geometric positions in the well;

(b) identifying and removing echoes resulting from a first interface in each waveform;

(c) determining a part of each remaining waveform due to casing resonance and analyzing each waveform to determine a parameter;

(d) sorting waveforms into bins, each bin including waveforms for which values of the parameter are substantially the same;

(e) determining a mean waveform for each bin and subtracting said mean waveform from each waveform in the bin; and (f) ordering the waveforms in accordance with the sequential geometric positions from which they were originally obtained and identifying echoes resulting from a third interface.

29. A method of analyzing acoustic waveforms obtained in a well having a casing located therein and surrounded by cement, comprising:

(a) obtaining a series of waveforms from sequential geometric positions in the well;

(b) normalizing and shifting the waveforms to align echoes resulting from a first interface;

(c) determining a parameter related to casing thickness for each waveform and sorting the waveforms into first bins, each first bin including waveforms for which values of the parameter are substantially the same;

(d) determining a mean waveform for each first bin and subtracting said mean waveform from each waveform in the corresponding first bins so as to remove echoes resulting from first and second interfaces and leave echoes resulting from third a third interface;

(e) shifting the waveforms to align third interface echoes:

(f) sorting the shifted waveforms according to values of the parameter related to thickness and dividing the sorted waveforms into second bins;

(g) determining a mean waveform for each second bin and subtracting a shifted version of this mean waveform from the corresponding waveform in the series so as to rename the third interface echo and provide a corrected series; and (h) analyzing the corrected series to determine a parameter related to the cement surrounding the casing.

* * * * *